US009008867B2

(12) United States Patent
Potagnik et al.

(10) Patent No.: US 9,008,867 B2
(45) Date of Patent: Apr. 14, 2015

(54) METHOD AND DEVICE FOR AUTOMATICALLY MONITORING THE ABILITY OF AN AIRCRAFT TO FOLLOW A FLIGHT TRAJECTORY WITH AT LEAST ONE TURN

(75) Inventors: Nicolas Potagnik, Toulouse (FR); Jean-Damien Perrie, Toulouse (FR); Thierry Bourret, Toulouse (FR); Jean Muller, Tournefeuille (FR); Florent Lanterna, Toulouse (FR)

(73) Assignee: Airbus Operations (S.A.S.), Toulouse Cedex (FR)

( * ) Notice: Subject to any disclaimer, the term of this patent is extended or adjusted under 35 U.S.C. 154(b) by 412 days.

(21) Appl. No.: 13/314,248

(22) Filed: Dec. 8, 2011

(65) Prior Publication Data
US 2012/0150367 A1    Jun. 14, 2012

(30) Foreign Application Priority Data

Dec. 9, 2010    (FR) ...................................... 10 60314

(51) Int. Cl.
G05D 1/00        (2006.01)
G05D 1/02        (2006.01)

(52) U.S. Cl.
CPC ............ G05D 1/0055 (2013.01); G05D 1/0202 (2013.01)

(58) Field of Classification Search
CPC ... G05D 1/0055; G05D 1/101; G05D 1/0202; G05D 1/10
USPC .......................................................... 701/3
See application file for complete search history.

(56) References Cited

U.S. PATENT DOCUMENTS

| 5,833,177 | A  | * | 11/1998 | Gast ............................... 244/195 |
| 7,650,232 | B1 |   | 1/2010  | Paielli |
| 8,306,678 | B2 | * | 11/2012 | Fleury et al. ....................... 701/9 |
| 2002/0193915 | A1 | * | 12/2002 | Miller ............................... 701/3 |
| 2008/0125972 | A1 | * | 5/2008 | Neff ................................ 701/300 |
| 2008/0133069 | A1 |   | 6/2008 | Morales De La Rica et al. |

FOREIGN PATENT DOCUMENTS

EP        0743244        11/1996

OTHER PUBLICATIONS

Randy Walter: "Flight Management Systems;" "chapeter 15" In: "The Avionics Handbook," 2001, C.R. Spitzer, New York, XP002648022, ISBN: 084938348X, pp. 1-25.
French Patent Office, French Search Report FR 10 60314, Aug. 10, 2011 (2 pgs).

* cited by examiner

Primary Examiner — John Q Nguyen
Assistant Examiner — Alan D Hutchinson
(74) Attorney, Agent, or Firm — Wood, Heron & Evans, LLP

(57) ABSTRACT

A monitoring device for automatically monitoring the ability of an aircraft to follow a flight trajectory with at least one turn includes a series of elements that estimate the ability of the aircraft to follow at least one turn of the flight trajectory. For example, a turn radius and limit speed for each of the upcoming turns in a flight plan (or a partial portion of the upcoming turns) are analyzed by comparing to a current speed of the aircraft to determine if there will be any risk of excursion outside the flight plan path, such that warnings can be emitted to a crew of the aircraft to take corrective action before the turns are performed. Consequently, required navigational performance maneuvers can be assured before the beginning of the turns in the flight plan.

16 Claims, 2 Drawing Sheets

METHOD AND DEVICE FOR AUTOMATICALLY MONITORING THE ABILITY OF AN AIRCRAFT TO FOLLOW A FLIGHT TRAJECTORY WITH AT LEAST ONE TURN

TECHNICAL FIELD

The present invention relates to a method and a device for automatically monitoring the ability of an aircraft, in particular of a transport airplane, to follow a flight trajectory comprising at least one turn.

Although not exclusively, the present invention more particularly applies to operations with required navigation performance with authorization required, of the Required Navigation Performance with Authorization Required ("RNP AR") type. These RNP AR operations are based on a surface navigation of the aRea NAVigation ("RNAV") type and on required navigation performance operations of the Required Navigation Performance ("RNP") type. They have the particular feature of requiring a special authorization for being able to be implemented on an aircraft.

BACKGROUND

The RNAV type surface navigation allows an aircraft to fly from a waypoint to another waypoint, and no longer from ground stations (of radio-navigation means of the NAVAID type) to ground stations.

As known, the RNP concept corresponds to a surface navigation, for which (on board the aircraft) monitoring and warning means are added, allowing to ensure that the aircraft remains in a corridor, referred to as RNP, around a reference trajectory and authorizing taking into consideration curved trajectories. Outside this corridor, potentially relief or other aircrafts could be present. The performance required for a RNP type operation is defined by a RNP value representing half the width (in nautical miles: NM) of the corridor around the reference trajectory, in which the aircraft should remain 95% of the time during the operation. A second corridor (around the reference trajectory) of half a width twice the RNP value is also defined. The probability that the aircraft goes out of this second corridor should be lower than $10^{-7}$ per hour of flight.

The concept of RNP AR operations is still even more stringent. The RNP AR procedures are indeed characterized by:
RNP values:
  being lower than or equal to 0.3 NM in approach, and that could go down to 0.1 NM; and
  being strictly lower than 1 NM at the start and during a throttling up, and that could also go down to 0.1 NM;
a final approach segment that could be curved; and
obstacles (mountains, traffic, . . . ) that could be located at twice the RNP value with respect to the reference trajectory, while for usual RNP operations, an additional margin with respect to obstacles is provided.

The air authorities have defined a target level of safety Target Level of Safety ("TLS") of $10^{-7}$ per operation, whatever the type. In the case of RNP AR operations, as the RNP values can go down to 0.1 NM and the obstacles could be located at twice the RNP value of the reference trajectory, this objective results in a probability that the aircraft goes out of the half-width corridor D=2.RNP that should not exceed $10^{-7}$ per procedure.

The equipment on board aircrafts (flight management system, inertial unit, means for updating GPS data and means for guiding the autopilot), as well as the usual architecture, do not allow to reach the target level of safety, if mitigation operational means are not provided, including for detecting and managing possible breakdowns. This is why a special authorization is required for this type of operation, so as to ensure that the operational procedures and the pilots' training allow the target level of safety to be reached. Moreover, as the crew should take in charge some breakdowns, the aircrafts are to-day not able to guarantee a RNP value of 0.1 NM in a breakdown situation, as the crew are not able to meet the performance requirements in manual piloting.

On current aircrafts, the monitoring of RNP AR operations is implemented by means of two usual functions, that is:
a first function monitoring the accuracy and the integrity of the position calculation:
  the accuracy of the position is compared to once the RNP value;
  the integrity is compared to twice the RNP value; and
  if one of the two parameters, accuracy or integrity, exceeds the allotted threshold, a warning is emitted and the crew should take appropriate actions; and
a second function allowing the crew to monitor the guidance of the aircraft:
  the lateral and vertical deviations of the aircraft with respect to the reference trajectory are displayed and shown to the crew;
  the crew monitors the deviations compared to the budgets allotted for each deviation. If the crew detects an excessive deviation, the crew should keep the aircraft under control again and take the adequate corrective actions.

As set forth previously, the current aircrafts are not able to guarantee a RNP value of 0.1 NM in a breakdown situation and the crew should be trained specially for flying the RNP AR procedures. The crew should, indeed, be able to detect and process, adequately, breakdowns being able to compromise the ongoing operation.

The objective for future aircrafts is to be able to fly RNP AR procedures with RNP values up to 0.1 NM, and this without restriction (in a normal situation and in the case of a breakdown) in start, approach and throttling up phases. To this end, the crew should no longer be considered as the main means for detecting and processing breakdowns.

The ability of an aircraft to follow a RNP AR trajectory comprising at least one turn, could be comprised under certain particular conditions, including in case of unfavourable winds. Under this type of conditions and depending on the wind force being encountered, the aircraft is sometimes no longer able to follow the defined trajectory. This type of problem could also occur when the speed of the aircraft exceeds a reference speed for the turn being started. This situation could, more specifically, occur as a result of a breakdown or of an error from the crew concerning a manually selected speed.

It is thus advantageous to be able to monitor the ability of the aircraft to meet the RNP AR performance. If the required performance level is not reached, the crew should be made aware of this, so as to be able to most appropriately react.

The present invention aims at solving the above mentioned drawbacks. It relates to a method for automatically monitoring the ability of an aircraft to follow a flight trajectory comprising at least one turn.

SUMMARY OF THE INVENTION

To this end, according to this invention, said method is remarkable in that, during a flight of the aircraft, for at least one turn of said flight trajectory, automatically:

(a) the radius of said turn is determined;
(b) a limit speed is determined up to which the aircraft may flight according to said turn without any risk of excursion of the flight trajectory;
(c) a current speed value of the aircraft is determined;
(d) said current speed value is compared to said limit speed; and
(e) from this comparison, it is inferred:
 if the current speed value is lower than or equal to said limit speed, that the aircraft can fly according to said turn without any risk of excursion; and
 if the current speed value is higher than said limit speed, that there is a risk of excursion.

Preferably, said steps (c), (d) and (e) are repeatedly implemented, upon a flight of the aircraft.

Thereby, thanks to the invention, through comparing the current speed of the aircraft, in particular a current ground speed, to an appropriately calculated limit speed, it is possible to monitor the adaptation of the speed of the aircraft to the turn(s) to be encountered, that is the ability of the aircraft to follow its trajectory with no risk of excursion.

Monitoring according to this invention performance of follow up of a trajectory with turn(s) is particularly adapted to the RNP context, but could be extended to any guidance context implemented according to a flight plan.

Advantageously, at step (e), a warning is emitted if there is a risk of excursion. Thus, if the required performance level is not met, the crew is made aware is are able to react in a most adapted way, either reducing its speed, or throttling up.

Additionally, advantageously, at step (a):
the radius of the turn being considered is determined from data (said radius of the turn or other data) extracted from an on-board database; or
said radius of the turn is calculated from a nominal roll of said turn.

Furthermore, in a preferred embodiment, the following operations are implemented:
at step (b), a theoretical maximum speed is determined, up to which the aircraft can fly according to said turn;
at step (d), the current speed value is compared to said theoretical maximum speed; and
at step (e) from this comparison, it is inferred:
 if the current speed value is lower than or equal to said theoretical maximum speed, that the aircraft is not in overspeed; and
 if the current speed value is higher than said theoretical maximum speed, that the aircraft is in overspeed.

In this case, preferably, at step (e):
a warning is emitted in case of a risk of excursion without overspeed; and
an alarm is emitted (being different from the warning) in the case of overspeed.

Thus, the warning level (warning, alarm) can be adapted to the actual situation: a simple risk of excursion without overspeed or an overspeed.

Additionally, advantageously, at step (b):
said theoretical maximum speed is calculated by means of a maximum roll and of a turn radius extracted from a database; and
said limit speed can be calculated, either by means of a limit roll and of a turn radius extracted from a database, either subtracting a constant value at a theoretical maximum speed.

Furthermore, said steps (a) to (e) are implemented:
either for the whole of the turns in the flight trajectory of the aircraft;
or for only a part of said turns, only analyzing the next turn or a reduced number of next turns for example, that could be enough for giving the crew some time to react in case of a problem.

Furthermore, advantageously, at step (e), an automatic regulation of the speed can also be implemented in the case of a risk of excursion.

The present invention further relates to a device for automatically monitoring the ability of an aircraft, in particular of a transport airplane, to follow a flight trajectory comprising at least one turn.

According to this invention, said device is remarkable in that it comprises:
 means for determining, upon a flight of the aircraft, the radius of at least one turn of said flight trajectory;
 means for determining a limit speed, up to which the aircraft can fly according to said turn without any risk of excursion of the trajectory;
 means for determining a current speed value of the aircraft;
 means for comparing this current speed value to said limit speed; and
 means for inferring from this comparison:
  if the current speed value is lower than or equal to said limit speed, that the aircraft can fly according to said turn without any risk of excursion of the flight trajectory; and
  if the current speed value is higher than said limit speed, that there is a risk of excursion.

Moreover, in a preferred embodiment, said device further comprises:
 means for determining a theoretical maximum speed, up to which the aircraft can fly according to said turn;
 means for comparing the current speed value to said theoretical maximum speed; and
 means for inferring from this comparison:
  if the current speed value is lower than or equal to said theoretical maximum speed, that the aircraft is not in overspeed; and
  if the current speed value is higher than said theoretical maximum speed, that the aircraft is in overspeed.

The present invention further relates to:
a guidance system of the aircraft, comprising a monitoring device, such as mentioned herein above; and
an aircraft, in particular a transport airplane, being provided with such a guidance system or such a monitoring device.

BRIEF DESCRIPTION OF DRAWINGS

The FIGS. of the appended drawings will better explain how this invention can be implemented. In these FIGS., like reference numerals relate to like components.

DETAILED DESCRIPTION

Figure 1:
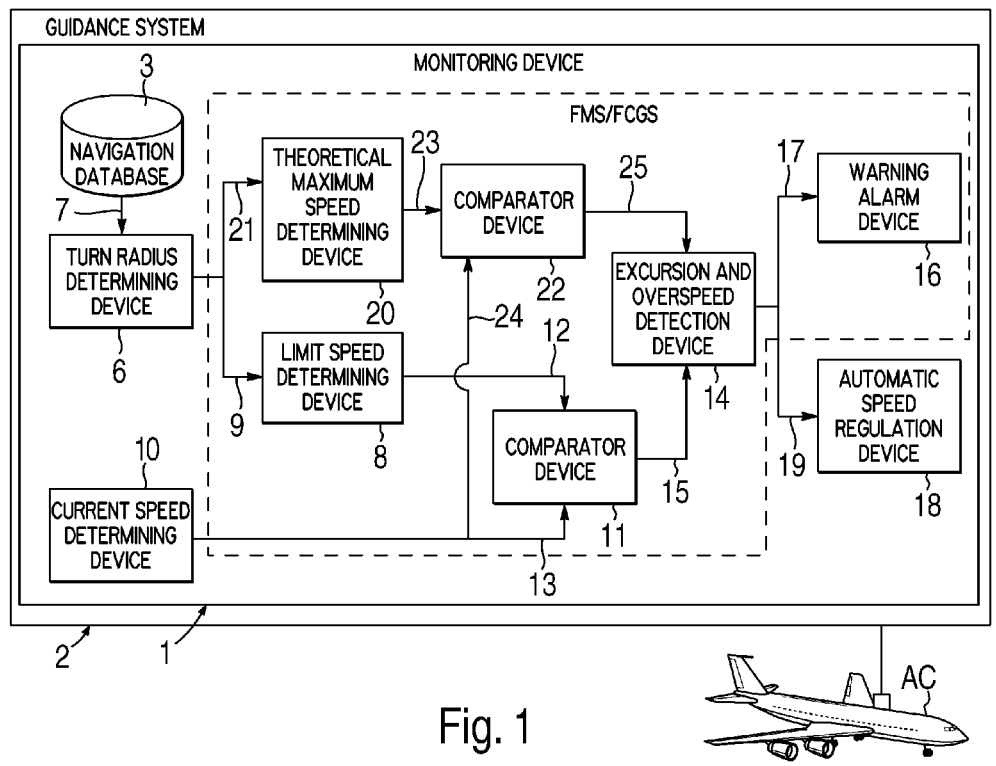
FIG. 1 is a block diagram of a device according to the invention.

The monitoring device 1 according to this invention and schematically shown on FIG. 1 is provided for automatically monitoring the ability of an aircraft AC, in particular of a transport airplane, to follow a flight trajectory TV comprising turns VA, VB, VC, VD, while checking whether the aircraft AC is able to fly according to these turns VA, VB, VC, VD. This monitoring device 1 could be part of a guidance system 2 of the aircraft AC.

Figure 2:
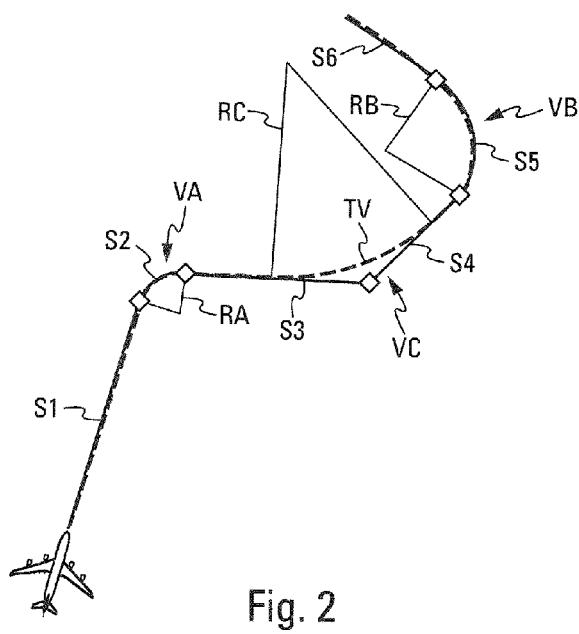
FIG. 2 is a diagram illustrating a flight plan with a series of turns, in accordance with an exemplary embodiment of the invention.

It is known that the navigation, in or out of a RNP context, is based on the information supplied by the flight plan. The latter is broken down in a succession of segments S1 to S6 defined in the side plan, as shown on FIG. 2. These segments could be of different types: segments of a straight line, such as S1, S3, S4, and S6, and circle arcs, such as S2 and S5. The turns VA, VB, VC being considered in the present invention could be basic segments of turn, such as S2 and S5, or a succession of two segments of a straight line, such as S3 and S4. For each turn VA, VB, VC of the flight plan, a navigation database 3 supplies its radius RA, RB, RC and the reference speed at which it should be started. The nominal roll angle applicable for following the described trajectory could be inferred from the previous parameters. Usually, a flight management system determines, from the position of the aircraft AC and from its attitude, parameters illustrating the deviation of the aircraft AC with respect to the trajectory TV. It also determines a nominal roll angle to be applied on the next segments, as a function of their radius of turn. From information being present in the flight plan and from data reflecting the position of the aircraft AC with respect to the flight trajectory TV, a usual transfer function with a large lateral loop calculates a turn initiation order of the aircraft AC. This order is afterwards transmitted to the small loop transfer function so as to slave the aircraft AC. Thereby, the flight management system calculates a turn initiation order being transferred to a flight control system for slaving the aircraft AC. This order could vary in a range comprised between $+\phi$ and $-\phi$, for example between +30 and −30 degrees, with respect to an attitude of the aircraft AC with the wings being flat (illustrated in dashes on FIG. 3, upon a nominal operation. The extreme attitudes are represented on the two parts and, on the left and on the right hand side, of FIG. 3. This range of values could, more specifically, be the authority limit of the large loop guidance.

Figure 4:
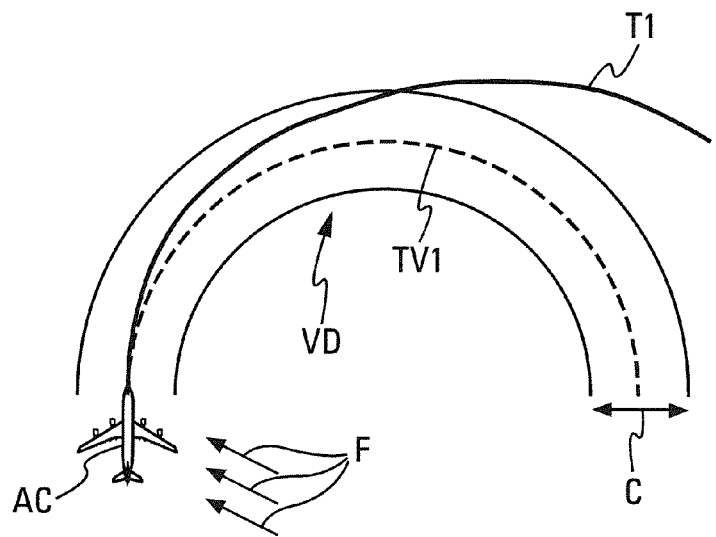
FIG. 4 is a diagram illustrating the effect of winds on an aircraft trying to fly along a RNP corridor according to the exemplary embodiment of the invention.

As set forth above, the ability of an aircraft AC to follow a flight trajectory TV1 comprising at least one turn VD could be compromised under certain particular conditions including in the case of unfavourable winds, as shown on FIG. 4 where the wind is highlighted by means of arrows F. Under this type of conditions and depending on the force of the wind being encountered, the aircraft AC could no longer be able to follow the defined trajectory TV1 so as to fly according to an actual trajectory T1 going out of a corridor C defined around the trajectory TV1, for example a usual RNP corridor. This type of problem could also occur when the speed of the aircraft AC exceeds a reference speed for the turn VD being started. Such a situation could, more specifically, occur as a result of a breakdown or as a result of an error from the crew concerning the manually selected speed.

The monitoring device 1 according to this invention aims at monitoring the ability of the aircraft AC to follow its flight trajectory so as to be able to detect a situation such as mentioned hereinabove.

To this end, the monitoring device 1 on-board the aircraft AC, comprises according to the invention:

a turn radius determining device 6 for determining, usually, for each turn being considered VA, VB, VC, the radius RA, RB, RC of said turn. The turn radius determining device 6 is connected, preferably, via a link 7 to the navigation database 3 and either extract directly the radius from the navigation database 3, or calculate usually the radius from data extracted from the navigation database 3;

a limited speed determining device 8 being connected via a link 9 to said turn radius determining device 6 and being formed so as to determine a limit speed Vlim, up to which the aircraft AC could fly according to said turn, without risk of excursion of the trajectory TV;

a current speed determining device 10 to determine a current speed value Vc of the aircraft AC;

a comparator device 11 being connected via links 12 and 13, respectively, to limited speed determining device 8 and current speed determining device 10 and being formed so as to compare this current speed value Vc to said limit speed Vlim; and an excursion and overspeed detection device 14 being connected via a link 15 to said comparator device 11 and being formed so as to infer from the previous comparison:

as long as the current speed Value Vc remains lower than or equal to said Limit speed Vlim, that the aircraft AC can fly According to the turn being considered without Any risk of excursion; and as soon as the current speed Value Vc becomes higher than said limit speed Vlim, that there is a risk of excursion.

Thus, through comparing the current speed Vc of the aircraft AC, in particular a current ground speed, to an appropriately calculated limit speed Vlim, the monitoring device 1 according to this invention is able to monitor the adaptation of the speed of the aircraft to the turn(s) to be encountered, that is the ability of the aircraft AC to follow its trajectory TV, and more specifically, to reach RNP AR performance.

Monitoring according to this invention is particularly adapted to the RNP context, but could be extended to any guidance context implemented according to a flight plan.

The monitoring device 1 further comprises a warning/alarm device 16 being connected via a link 17 to excursion and overspeed detection device 14 and being formed so as to emit a warning, of the visual or sound type, in the cockpit of the aircraft AC, as soon as the excursion and overspeed detection device 14 considers that there is a risk of excursion. Thus, if the performance level is not met, the crew is immediately made aware and are able to react in a most adapted way, either manually reducing the speed of the aircraft AC, or controlling a throttling up.

This invention thus provides warnings to the crew, so that they are able to react accordingly should a problem occur, manually adjusting the speed of the aircraft AC. It is also possible to implement an automatic regulation of the speed of the aircraft AC.

To this end, in a particular embodiment, the monitoring device 1 further comprises an automatic speed regulation device 18 being connected via a link 19 to the excursion and overspeed detection device 14 and being formed so as to implement an automatic regulation of the speed in the case of a risk of excursion, preferably bounding it systematically to the limit speed Vlim. If, however, the automatic regulation of the speed does not allow meeting the desired performance level, this approach could be completed by relevantly selected warning levels (and emitted by the warning/alarm device 16).

Moreover, in a preferred embodiment, monitoring device 1 further comprises:

a theoretical maximum speed determination device 20 being connected via a link 21 to the turn radius determining device 6 and being formed so as to determine a theoretical maximum speed Vmax, up to which the aircraft AC can fly according to the turn being considered;

a comparator device 22 being connected via links 23 and respectively to the theoretical maximum speed determination device 20 and the current speed determining device 10 and being formed so as to compare the current speed value Vc (received from the current speed determining device 10) to said theoretical maximum speed Vmax; and the excursion and overspeed detection device 14 being connected via a link 25 to the comparator device 22 and being formed so as to infer from the previous comparison:

as long as the current speed value Vc remains lower than or equal to said theoretical maximum speed Vmax, that the aircraft AC is not in overspeed; and as soon as the current speed value Vc becomes higher than said theoretical maximum speed Vmax, that the aircraft AC is in overspeed.

In such a case, the warning/alarm device 16 is formed so as:

to emit a warning, of the visual or sound type, in the cockpit of the aircraft A, as soon as the excursion and overspeed detection device 14 considers that there is a risk of excursion; and to emit in the cockpit of the aircraft A an alarm, also of the visual or sound type, but being different from said warning, and this as soon as the excursion and overspeed detection device 14 considers that there is a case of overspeed.

Thus, the warning level can be adapted (warning, alarm) to the actual situation: a simple risk of excursion without overspeed or an overspeed.

Furthermore, the current speed determining device 10 determines usually the current speed Vc of the aircraft AC in a referential adapted for the implementation context. This could be the speed of the aircraft AC relative to the speed of the air or even the speed of the aircraft AC in the ground benchmark, for instance. In order that any turn could be triggered without risk of excursion, it is thus advisable to compare the current speed Vc to the limit speed Vlim for ensuring that the speed of the aircraft AC is adapted for the trajectory to be followed, for instance, for ensuring that the speed of the aircraft AC allows to remain on a trajectory of the RNP type, despite unfavourable winds. The theoretical maximum speed Vmax may be employed as a complement for evaluating the level of risk, to which the current speed Vc submits the aircraft AC.

Furthermore, the limit speed determining device 8 calculates said limit speed Vlim based on the following expression:

$$V\text{lim} = \sqrt{R.g.tg(\emptyset\text{lim})}$$

wherein:
R represents the radius of the turn being considered;
tg represents the tangent;
g represents the gravity acceleration; and
Ølim corresponds to a limit, preferably predetermined, roll, for instance 20°.

Figure 3:
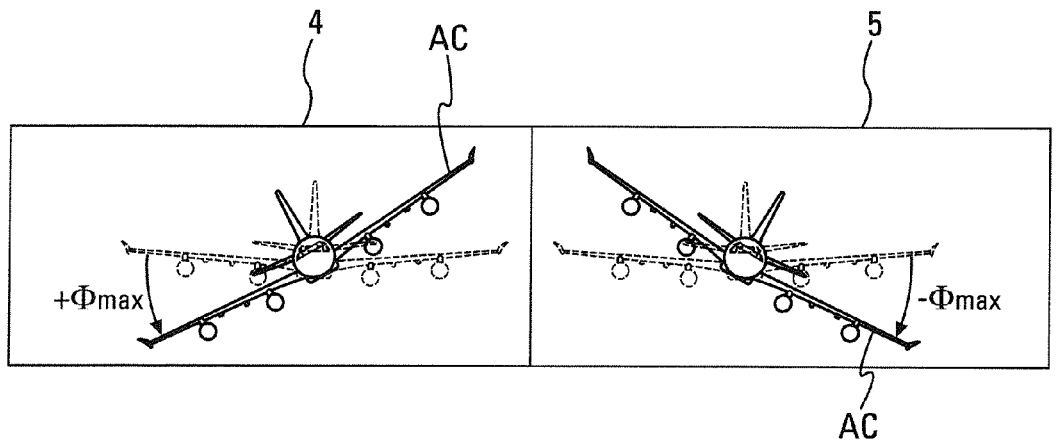
FIG. 3 is a diagram illustrating limits of aircraft roll or turning used with the exemplary embodiment of the invention.

Furthermore, the theoretical maximum speed determination device 20 calculates said theoretical maximum speed Vmax based on the following expression:

$$V\text{max} = \sqrt{R.g.tg(\emptyset\text{max})}$$

wherein Ømax corresponds to a maximum, preferably predetermined, roll, for instance 30° as shown on FIG. 3.

Being integrated into the systems involved in the guidance loop of the guidance system 2 (being only partially shown on FIG. 1), the monitoring device 1 could be implemented according to different embodiments. In a first embodiment, the whole of the device of said monitoring device 1, except current speed determining device 10 and automatic speed regulation device 18, are integrated into a flight management system of the Flight Management System ("FMS") type. In this first embodiment, monitoring is therefore concentrated in the flight management system then operating directly on the data extracted from the navigation database 3.

Furthermore, in a second embodiment, including the limit speed determining devices 8, comparator device 11, excursion and overspeed detection 14, warning/alarm device 16, theoretical maximum speed determination device 20, and comparator device 22 of said monitoring device 1 are integrated into a Flight Control and Guidance System of the FCGS type. In this second embodiment, monitoring is distributed between the FCGS and FMS systems, the FMS system supplying in particular the information relative to the flight plane.

It should be noticed, in an alternative, that, contrarily to the previously detailed principle, for which a controlled roll margin Ølim is determined on a constant basis, a speed margin could also be selected as constant CS. In this case, the device 1 can calculate the limit speed Vlim from the following relationship:

$$V\text{lim} = V\text{max} - CS$$

With a constant speed margin CS and depending on the selected value, it is possible to tolerate higher rolls for high ground speeds.

The previously presented approaches are based on data or radiuses of turn extracted from the navigation database 3. It is also possible to rely on a turn nominal roll, allowing the turn radius determining device 6 to infer the radius of the turn. To this end, it is known that on the current flight management systems FMS, the nominal roll of the turn is calculated for each turn of the flight plan.

A particular application of the monitoring device 1 according to this invention relates to a monitoring covering all the future turns on an ongoing RNP procedure. However, it could also be contemplated that the monitoring device 1 only monitors a sub-part of all these turns, only analyzing the or one reduced number of next turns, that could be sufficient for giving the crew some time to react should a problem occur. Beyond a certain number of next turns, the current speed of the aircraft AC in the ground benchmark is no longer able to be implemented: a prediction of the ground speed of the aircraft AC could then be used for implementing this invention.

The invention claimed is:

1. A method for automatically monitoring the ability of an aircraft to follow a flight trajectory comprising at least one next turn, the method comprising, during a flight of the aircraft and before performance of the at least one next turn, automatically:

(a) determining the radius of the at least one next turn;
(b) determining a limit speed for the at least one next turn from the determined radius;
(c) determining a current speed value of the aircraft;
(d) comparing said current speed value to said limit speed; and
(e) inferring, from the comparison:
  if the current speed value is lower than or equal to said limit speed, that the aircraft can fly according to the at least one next turn without any risk of excursion of the flight trajectory while performing the at least one next turn; and
  if the current speed value is higher than said limit speed, that there is a risk of excursion of the flight trajectory while performing the at least one next turn, and when the risk of excursion is determined, a warning is emitted to a crew of the aircraft such that corrective action can be taken before the aircraft performs the at least one next turn with a risk of excursion.

2. The method according to claim 1, wherein step (a) further comprises:
determining said radius of the at least one next turn from data extracted from an on-board database.

3. The method according to claim 1, wherein step (a) further comprises:
calculating said radius of the at least one next turn from a nominal roll of said at least one next turn.

4. The method according to claim 1, wherein said steps (c), (d) and (e) are repeatedly implemented, upon a flight of the aircraft.

5. The method according to claim 1, wherein, in addition:
step (b) further includes determining a theoretical maximum speed, up to which the aircraft can fly according to the at least one next turn;
step (d) further includes comparing the current speed value to said theoretical maximum speed; and
step (e) further includes inferring, from the comparison:
if the current speed value is lower than or equal to said theoretical maximum speed, that the aircraft is not in overspeed; and
if the current speed value is higher than said theoretical maximum speed, that the aircraft is in overspeed.

6. The method according to claim 5, wherein step (b) further includes calculating said theoretical maximum speed Vmax from the following expression:

$$V\text{max} = \sqrt{R.g.tg(\Phi\text{max})}$$

wherein:
R represents said radius of the at least one next turn;
tg represents a tangent;
g represents the gravity acceleration; and
Ømax corresponds to a maximum roll.

7. The method according to claim 1, wherein step (b) further includes calculating said limit speed from the following expression:

$$V\text{lim} = \sqrt{R.g.tg(\Phi\text{lim})}$$

wherein:
R represents said radius of the at least one next turn;
tg represents a tangent;
g represents the gravity acceleration; and
Ølim corresponds to a limit roll.

8. The method according to claim 1, wherein step (b) further comprises, when calculating said limit speed Vlim:
subtracting a constant value at a theoretical maximum speed determined from the radius of the at least one next turn.

9. The method according to claim 1,
wherein the at least one next turn includes a plurality of next turns, and said steps (a) to (e) are implemented for all of the plurality of next turns of said flight trajectory, thereby to determine if a risk of excursion is detected for any of the plurality of next turns of said flight trajectory.

10. The method according to claim 5, wherein step (e) further comprises:
emitting a warning of a first level to the crew in case of a risk of excursion without overspeed; and
emitting an alarm of a second level, different than the first level, to the crew in case of an overspeed.

11. The method according to claim 1, wherein step (e) further comprises:
implementing an automatic regulation of the speed, when performing a turn with a risk of excursion, in the case of a risk of excursion.

12. A device for automatically monitoring the ability of an aircraft to follow a flight trajectory comprising at least one next turn, said device comprising:
a turn radius determining device for determining, during a flight of the aircraft and before performance of the at least one next turn, the radius of the at least one next turn of said flight trajectory to be performed by the aircraft;
a limit speed determining device for determining a limit speed for the at least one next turn from the determined radius;
a current speed determining device for determining a current speed value of said aircraft;
a comparator device for comparing the current speed value to said limit speed; and
an excursion and overspeed detection device for inferring, from this comparison:
if the current speed value is lower than or equal to said limit speed, that the aircraft can fly according to the at least one next turn without any risk of excursion of the flight trajectory while performing the at least one next turn; and
if the current speed value is higher than said limit speed, that there is a risk of excursion of the flight trajectory while performing the at least one next turn, and when the risk of excursion is determined, a warning is emitted to a crew of the aircraft such that corrective action can be taken before the aircraft performs the at least one next turn with a risk of excursion.

13. The device according to claim 12, further comprising:
a theoretical maximum speed determining device for determining a theoretical maximum speed, up to which the aircraft can fly according to the at least one next turn; and
a comparator device for comparing the current speed value to said theoretical maximum speed;
wherein the excursion and overspeed detection device infers, from this comparison:
if the current speed value is lower or equal to said theoretical maximum speed, that the aircraft is not in overspeed; and
if the current speed value is higher than said theoretical maximum speed, that the aircraft is in overspeed.

14. An aircraft, comprising a device such as specified in claim 12.

15. The device according to claim 12, wherein the at least one next turn includes a plurality of next turns, and the excursion and overspeed detection device determines whether a risk of excursion is present for all of the plurality of next turns of said flight trajectory, thereby to determine if a risk of excursion is detected for any of the plurality of next turns of said flight trajectory.

16. The device according to claim 13, further comprising:
an alarm/warning device which:
emits a warning of a first level to the crew in case of a risk of excursion without overspeed; and
emits an alarm of a second level, different than the first level, to the crew in case of an overspeed.

* * * * *